(12) United States Patent
Kim et al.

(10) Patent No.: US 8,140,437 B2
(45) Date of Patent: Mar. 20, 2012

(54) METHOD OF RECORDING AND REPRODUCING SAMPLE DATA TO/FROM A RECORDING MEDIUM AND SAMPLE DATA CONTAINING RECORDING MEDIUM

(75) Inventors: Hyung Sun Kim, Seoul (KR); Byung Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/511,411

(22) Filed: Aug. 29, 2006

(65) Prior Publication Data

US 2006/0294015 A1 Dec. 28, 2006

Related U.S. Application Data

(62) Division of application No. 10/258,885, filed as application No. PCT/KR02/00425 on Mar. 12, 2002, now Pat. No. 7,117,179.

(30) Foreign Application Priority Data

Mar. 12, 2001 (KR) .................................. 2001-12997

(51) Int. Cl.
*G06F 21/00* (2006.01)
(52) U.S. Cl. ............ 705/51; 705/59; 725/109; 725/110; 725/112; 380/201; 380/227; 380/278; 380/279
(58) Field of Classification Search ............... 705/50–79; 725/109, 110, 112; 380/201, 227, 278, 279
See application file for complete search history.

(56) References Cited

U.S. PATENT DOCUMENTS

| 5,138,925 A | 8/1992 | Koguchi et al. |
| 5,319,705 A | 6/1994 | Halter et al. |
| 5,594,794 A | 1/1997 | Eyer et al. |
| 5,646,992 A | 7/1997 | Subler et al. |
| 5,715,403 A * | 2/1998 | Stefik ............................... 705/44 |
| 5,729,549 A | 3/1998 | Kostreski et al. |
| 5,798,991 A | 8/1998 | Haneda |
| 5,805,551 A | 9/1998 | Oshima et al. |
| 5,812,661 A | 9/1998 | Akiyama et al. |
| 5,825,876 A | 10/1998 | Peterson, Jr. |

(Continued)

FOREIGN PATENT DOCUMENTS

CN 1166223 A 11/1997

(Continued)

OTHER PUBLICATIONS

"High density DVD logical format," Optical Disk Standardization Committee, 2000, pp. 99-109, Japan, ISBN4-542-30522-8.

*Primary Examiner* — Andrew J. Fishcher
*Assistant Examiner* — Mamon Obeid
(74) *Attorney, Agent, or Firm* — Birch, Stewart, Kolasch & Birch, LLP

(57) ABSTRACT

The present invention provides according to an embodiment a method of reproducing content, comprising the steps of: (a) receiving a digital content from an external source, the digital content protected by Digital Right Management (DRM) information, the DRM information authorizing a reproduction of the digital content; (b) requesting the DRM information to an external source based on URL (Uniform Resource Locator) information in order to normally reproduce the digital content; and (c) reproducing the digital content based on the DRM information.

13 Claims, 6 Drawing Sheets

U.S. PATENT DOCUMENTS

| | | |
|---|---|---|
| 5,923,627 A | 7/1999 | Miwa et al. |
| 5,933,498 A | 8/1999 | Schneck et al. |
| 5,991,399 A | 11/1999 | Graunke et al. |
| 6,011,761 A * | 1/2000 | Inoue ............... 705/26 |
| 6,041,345 A | 3/2000 | Levi et al. |
| 6,044,047 A | 3/2000 | Kulas |
| 6,075,862 A | 6/2000 | Yoshida et al. |
| 6,125,229 A | 9/2000 | Dimitrova et al. |
| 6,140,565 A | 10/2000 | Yamauchi et al. |
| 6,252,964 B1 | 6/2001 | Wasilewski et al. |
| 6,278,836 B1 | 8/2001 | Kawara et al. |
| 6,351,442 B1 * | 2/2002 | Tagawa et al. ............. 369/53.41 |
| 6,385,389 B1 * | 5/2002 | Maruyama et al. ........... 386/248 |
| 6,453,459 B1 | 9/2002 | Brodersen et al. |
| 6,510,502 B1 | 1/2003 | Shimizu |
| 6,567,371 B1 | 5/2003 | Otomo et al. |
| 6,567,567 B1 | 5/2003 | Levin et al. |
| 6,574,419 B1 | 6/2003 | Nonomura et al. |
| 6,675,179 B2 | 1/2004 | Morohashi |
| 6,694,090 B1 | 2/2004 | Lewis et al. |
| 6,868,403 B1 | 3/2005 | Wiser et al. |
| 6,889,327 B1 | 5/2005 | Inoha |
| 6,901,385 B2 | 5/2005 | Okamoto et al. |
| 6,920,567 B1 | 7/2005 | Doherty et al. |
| 6,931,451 B1 | 8/2005 | Logan et al. |
| 6,938,162 B1 | 8/2005 | Nagai et al. |
| 6,988,144 B1 | 1/2006 | Luken et al. |
| 7,058,977 B1 | 6/2006 | Furukawa et al. |
| 7,062,468 B2 * | 6/2006 | Hillegass et al. ............... 705/59 |
| 7,073,063 B2 | 7/2006 | Peinado |
| 7,076,468 B2 * | 7/2006 | Hillegass et al. ............... 705/56 |
| 7,092,911 B2 | 8/2006 | Yokota et al. |
| 7,103,574 B1 * | 9/2006 | Peinado et al. ................. 705/51 |
| 7,113,983 B1 | 9/2006 | Terada et al. |
| 7,117,179 B2 | 10/2006 | Kim et al. |
| 7,124,303 B2 | 10/2006 | Candelore et al. |
| 7,191,153 B1 | 3/2007 | Braitberg et al. |
| 7,225,162 B2 | 5/2007 | Kim et al. |
| 7,380,135 B2 | 5/2008 | Nishimoto et al. |
| 7,499,993 B2 | 3/2009 | Seo |
| 7,519,274 B2 | 4/2009 | Li |
| 7,542,656 B2 | 6/2009 | Cho et al. |
| 7,587,368 B2 | 9/2009 | Felsher |
| 2001/0013022 A1 | 8/2001 | Proidl |
| 2001/0026618 A1 | 10/2001 | Van Wie et al. |
| 2001/0030911 A1 | 10/2001 | Kim et al. |
| 2002/0010679 A1 | 1/2002 | Felsher |
| 2002/0023010 A1 | 2/2002 | Rittmaster et al. |
| 2002/0032747 A1 | 3/2002 | Toki |
| 2002/0077988 A1 | 6/2002 | Sasaki et al. |
| 2002/0107809 A1 | 8/2002 | Biddle et al. |
| 2002/0112226 A1 | 8/2002 | Brodersen et al. |
| 2002/0157521 A1 | 10/2002 | Shahal |
| 2002/0172366 A1 | 11/2002 | Peterka et al. |
| 2003/0048293 A1 | 3/2003 | Werkhoven |
| 2003/0051151 A1 | 3/2003 | Asano et al. |
| 2003/0105717 A1 | 6/2003 | Kim et al. |
| 2004/0024688 A1 | 2/2004 | Bi et al. |
| 2004/0088183 A1 | 5/2004 | Nakanishi et al. |
| 2004/0255330 A1 | 12/2004 | Logan |
| 2005/0036763 A1 | 2/2005 | Kato et al. |
| 2005/0084251 A1 | 4/2005 | Kitahashi et al. |
| 2005/0096983 A1 | 5/2005 | Werkhoven |
| 2005/0238057 A1 | 10/2005 | Toma et al. |
| 2005/0259531 A1 | 11/2005 | Kim et al. |
| 2006/0059128 A1 | 3/2006 | Ruggle et al. |
| 2006/0095381 A1 | 5/2006 | Yokota et al. |
| 2006/0294009 A1 | 12/2006 | Kim et al. |
| 2007/0174568 A1 | 7/2007 | Kii |
| 2007/0180534 A1 | 8/2007 | Ishizaka et al. |
| 2008/0034222 A1 | 2/2008 | Torisaki et al. |
| 2008/0222180 A1 | 9/2008 | Kim et al. |
| 2008/0240442 A1 | 10/2008 | Kim et al. |
| 2009/0086966 A1 | 4/2009 | Haruki et al. |
| 2009/0172598 A1 | 7/2009 | Yamanaka et al. |
| 2009/0287837 A1 | 11/2009 | Felsher |

FOREIGN PATENT DOCUMENTS

| | | |
|---|---|---|
| CN | 1219728 A | 6/1999 |
| CN | 1273669 A | 11/2000 |
| DE | 199 06 449 C1 | 8/2000 |
| EP | 0 788 106 B1 | 8/1997 |
| EP | 802527 A1 | 10/1997 |
| EP | 899733 A1 | 3/1999 |
| EP | 911738 A2 | 4/1999 |
| EP | 1 079 628 A2 | 8/2000 |
| EP | 1 041 566 B1 | 10/2000 |
| EP | 1 122 729 A1 | 8/2001 |
| EP | 1 126 463 B1 | 8/2001 |
| EP | 0 798 892 B1 | 7/2006 |
| JP | 63-213188 A | 9/1988 |
| JP | 05-225759 A | 9/1993 |
| JP | 8-18552 A | 1/1996 |
| JP | 9-44353 A | 2/1997 |
| JP | 9-73480 A | 3/1997 |
| JP | 9-73487 A | 3/1997 |
| JP | 9-91344 A | 4/1997 |
| JP | 10-135944 A | 5/1998 |
| JP | 10-208388 A | 8/1998 |
| JP | 10-208444 A | 8/1998 |
| JP | 10-255448 A | 9/1998 |
| JP | 10-257416 A | 9/1998 |
| JP | 10-289206 A | 10/1998 |
| JP | 10326463 A | 12/1998 |
| JP | 11-66813 A | 3/1999 |
| JP | 11-143719 A | 5/1999 |
| JP | 11-213553 A | 8/1999 |
| JP | 11-238365 A | 8/1999 |
| JP | 11-312175 A | 11/1999 |
| JP | 11-328851 A | 11/1999 |
| JP | 11-353800 A | 12/1999 |
| JP | 2000-35885 A | 2/2000 |
| JP | 2000-76338 A | 3/2000 |
| JP | 2000-83022 A | 3/2000 |
| JP | 2000-163488 A | 6/2000 |
| JP | 2000-163877 A | 6/2000 |
| JP | 2000-195175 A | 7/2000 |
| JP | 2000-196585 A | 7/2000 |
| JP | 2000-253364 | 9/2000 |
| JP | 2000-268096 A | 9/2000 |
| JP | 2000-268497 A | 9/2000 |
| JP | 2000-276840 A | 10/2000 |
| JP | 2000-298689 A | 10/2000 |
| JP | 2000-322875 A | 11/2000 |
| JP | 2000-330873 A | 11/2000 |
| JP | 2000-332706 A | 11/2000 |
| JP | 2000-348003 A | 12/2000 |
| JP | 2000-350181 A | 12/2000 |
| JP | 2001-6334 A | 1/2001 |
| JP | 2001-42866 A | 2/2001 |
| JP | 2001-52467 A | 2/2001 |
| JP | 2001-103047 A | 4/2001 |
| JP | 2001-216418 A | 8/2001 |
| JP | 2003-502722 A | 1/2003 |
| JP | 2004-519808 A | 7/2004 |
| JP | 2005-204175 A | 7/2005 |
| JP | 2006-039176 A | 2/2006 |
| JP | 2007-189443 A | 7/2007 |
| JP | 2007-213327 A | 8/2007 |
| JP | 2009-182946 | 8/2009 |
| JP | 11-296984 A | 10/2009 |
| KR | 2001-0097945 A | 11/2001 |
| WO | WO-00/05715 A1 | 2/2000 |
| WO | WO-00/51036 A2 | 8/2000 |
| WO | WO-00/67130 A1 | 11/2000 |
| WO | 01/15164 A1 | 3/2001 |
| WO | WO-02/073616 A1 | 9/2002 |

\* cited by examiner

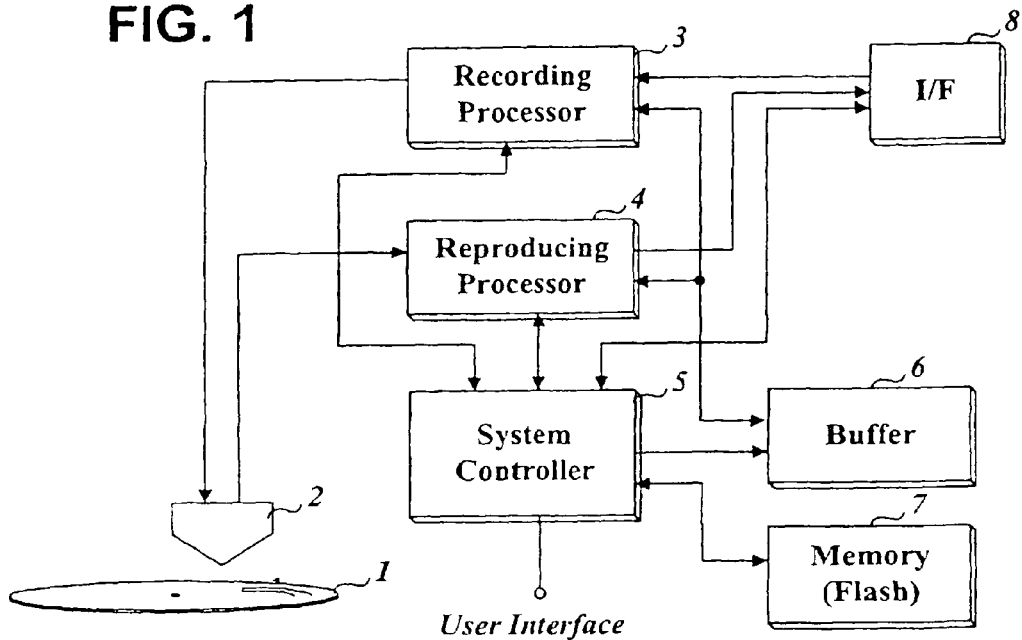

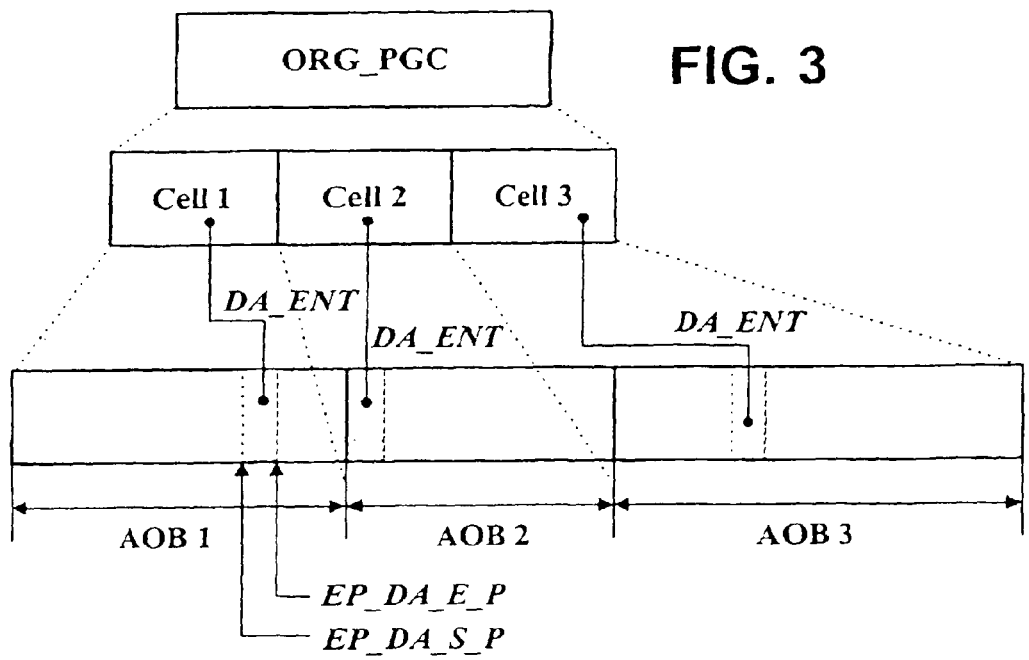
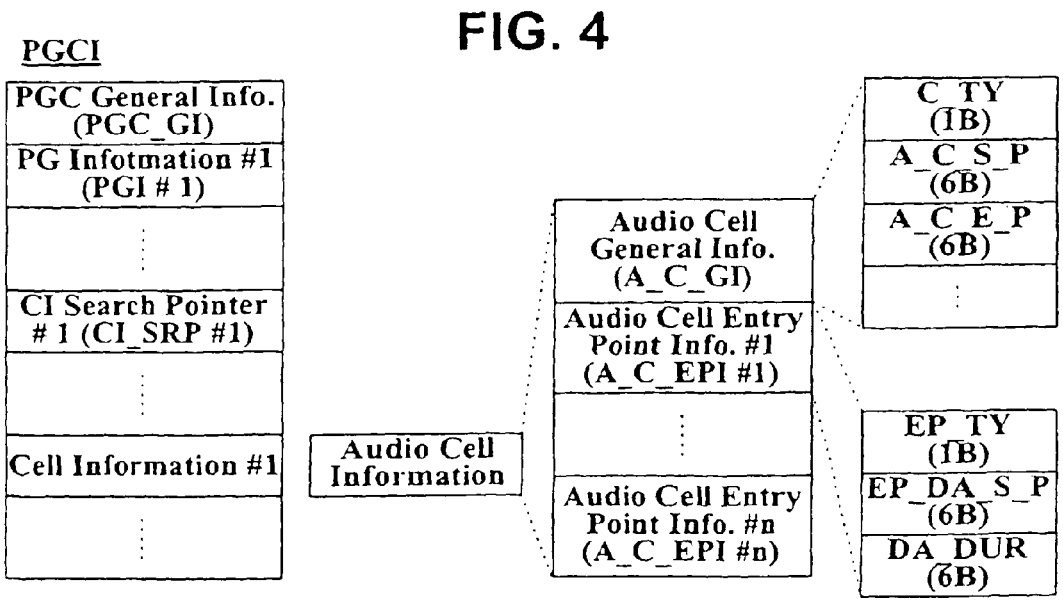

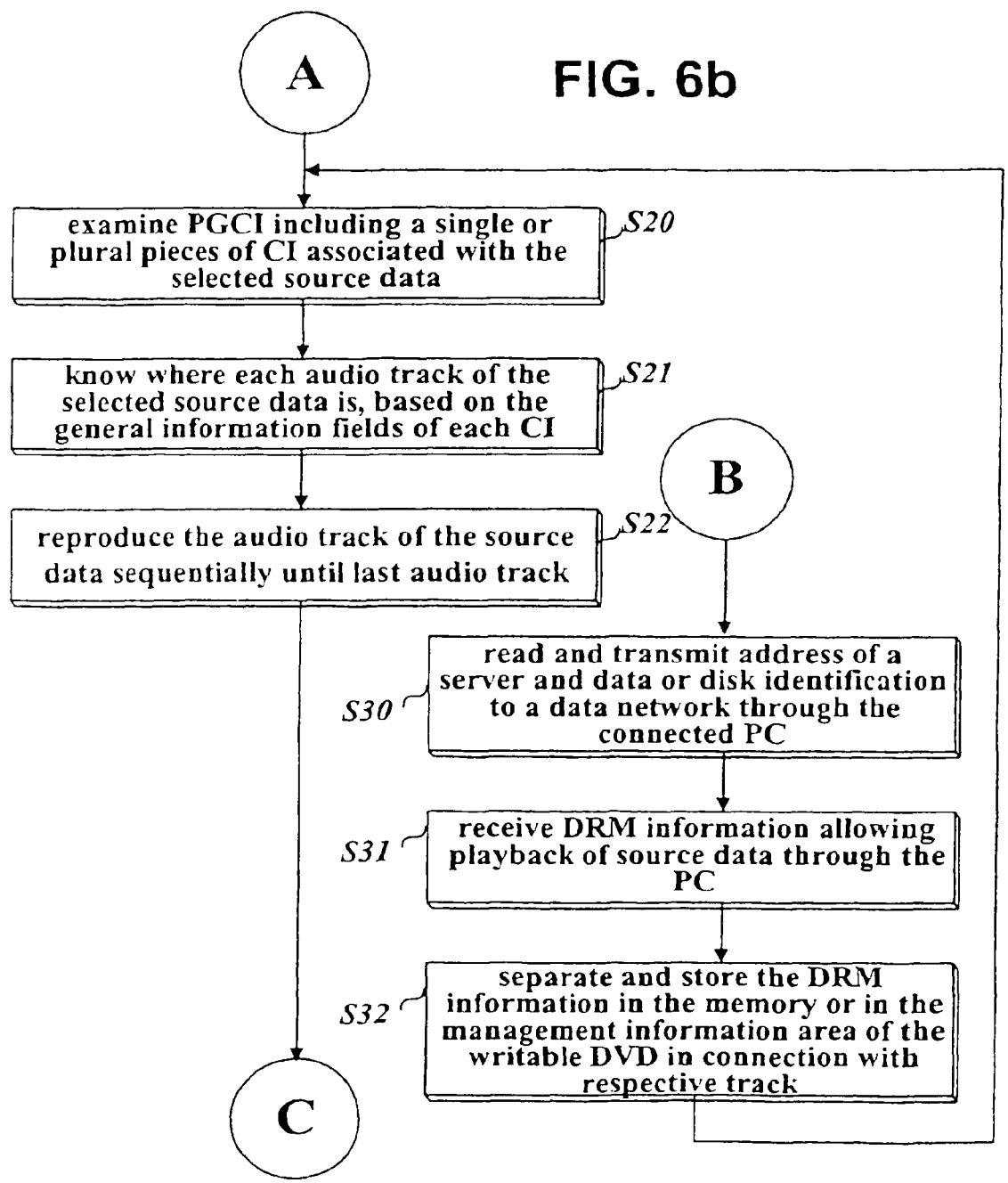

METHOD OF RECORDING AND REPRODUCING SAMPLE DATA TO/FROM A RECORDING MEDIUM AND SAMPLE DATA CONTAINING RECORDING MEDIUM

This application is a Divisional of U.S. patent application Ser. No. 10/258,885 filed on Oct. 29, 2002 now U.S. Pat. No. 7,117,179 and for which priority is claimed under 35 U.S.C. §120, and also claims priority benefits of Korean Patent Application No. 2001-12997 filed on Mar. 12, 2001 in Korea. U.S. patent application Ser. No. 10/258,885 is the national phase of PCT International Application No. PCT/KR02/00425 filed on Mar. 12, 2002 under 35 U.S.C. §371. The entire contents of each of the above-identified applications are hereby incorporated by reference.

BACKGROUND OF THE INVENTION

1. Field of the Invention

The present invention relates to a method of recording sample data to a recording medium and a sample data containing recording medium. The present invention further relates to a method of reproducing entire recorded source data or only short data section containing sample data at a playback request depending on whether the playback is authorized or not.

2. Discussion of the Background Art

A disk-type recording medium such as a compact disk (CD) can store high-quality digital audio data permanently, so that it is very popular recording medium. Recently, a digital versatile disk (referred as 'DVD' hereinafter) has been developed as a new disk-type recording medium. A DVD can store much larger size than a CD, thus, high-quality moving picture or audio data are recorded on a DVD for much longer time. Therefore, a DVD will be used widely in the near future.

There are three types of a DVD, DVD-ROM for read-only, DVD-R for write-once, and DVD-RAM or DVD-R/W for rewritable. For a rewritable DVD, the standardization of data writing format is in progress.

In these days, various types of digital audio data are provided through a data network such as Internet. Such audio data are called EMD (Electronic Music Distribution) audio data. EMD audio data are provided by a lot of contents providers. However, the contents providers encode EMD audio data to mutually different formats and add different unique copy-protection codes to EMD audio data as well to prevent unauthorized copy and protect their copyright.

Therefore, a decoder and a decryption code adequate for downloaded EMD audio data must be obtained from a contents provider having provided the EMD audio data before playing the downloaded EMD audio data. The decryption code is used for decrypting EMD audio data encrypted with a corresponding copy-protection code.

Because it is nearly impossible to obtain both a suitable decryption code and a decoder without lawful approval, EMD audio data can be protected against unauthorized copy, thus its copyright can be protected well.

As mentioned before, because a large-capacity recording medium is being commercialized and anti-piracy of EMD audio data becomes possible, it is expected that EMD audio data are spread greatly over a data network in the near future.

However, EMD audio data, in general, are entirely encrypted with a copy-protection code. Therefore, a user can not play any piece of EMD audio data downloaded onto a writable DVD through a disk device before he or she purchases a decryption code. In other words, a user can not confirm at all whether the downloaded EMD audio data are what he or she wants or whether its audio quality is better or not than he or she expected.

Consequently, a user hesitates to buy a play-authorizing code, namely, a decryption code for the downloaded EMD audio data, which would impede spread and distribution of digital audio data through a data network such as Internet.

SUMMARY OF THE INVENTION

It is an object of the present invention to provide a method of recording moving picture data and/or audio data onto a recording medium as designating their sample data.

It is another object of the present invention to provide a recording medium on which moving picture data and/or audio data have been recorded wherein their sample data are designated for the recorded moving picture or audio data.

It is another object of the present invention a method of selectively reproducing entire source data recorded on a recording medium or only short data section containing sample data of the source data depending on whether play-authorizing information is obtained.

A recording medium for storing data in accordance with the an aspect of present invention includes a first area for storing data; and a second area for storing management information for the data stored in said first area, wherein source data including at least one data track are recorded in said first area, and wherein location information pointing a data section, a part of the source data, is recorded in said second area, the data section being designated sample data for the source data.

A method of recording data to a recording medium in accordance with another aspect the present invention comprises the steps of: writing received data in a data recording area of a recording medium; checking whether there is play-authorizing information that allows entire playback of the written data; and writing location information pointing a data section, a part of the written data, in a management information area of the recording medium if there is not play-authorizing information, wherein the data section being designated sample data for the source data.

A method of reproducing data from a recording medium in accordance with another aspect of the present invention comprises the steps of: checking when play of recorded data is requested, whether or not there is play-authorizing information stored on a recording medium or in a disk device, the play-authorizing information allowing entire playback of the recorded data; reading location information pointing a data section, a part of the recorded data, if there is not play-authorizing information, the data section being designated sample data for the recorded data; and reproducing the data section using the read location information, instead of the recorded data of which play has been requested.

The present invention discussed herein enables a user to confirm whether source data downloaded onto or written on a recording medium such as a writable DVD are what he or she wants without buying play-authorizing information for the source data. Consequently, purchase of play-authorizing information for moving-picture or audio source data is naturally induced from previewing or pre-listening sample data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 1 is a simplified block diagram of an optical disk device in which a data recording/reproducing method of the present invention is embedded;

FIG. 2 is an illustrative format of management information created by a data recording method of the present invention;

FIG. 3 shows a schematic relation between audio objects including respective sample audio sections therein and their management information formed on a basis of the format of FIG. 2;

FIG. 4 is another illustrative format of management information created by a data recording method of the present invention;

FIGS. 6a and 6b are flow charts of an embodiment of a method playing entire or sample data selectively in accordance with the present invention.

DETAILED DESCRIPTION OF THE PREFERRED EMBODIMENTS

Figure 5:
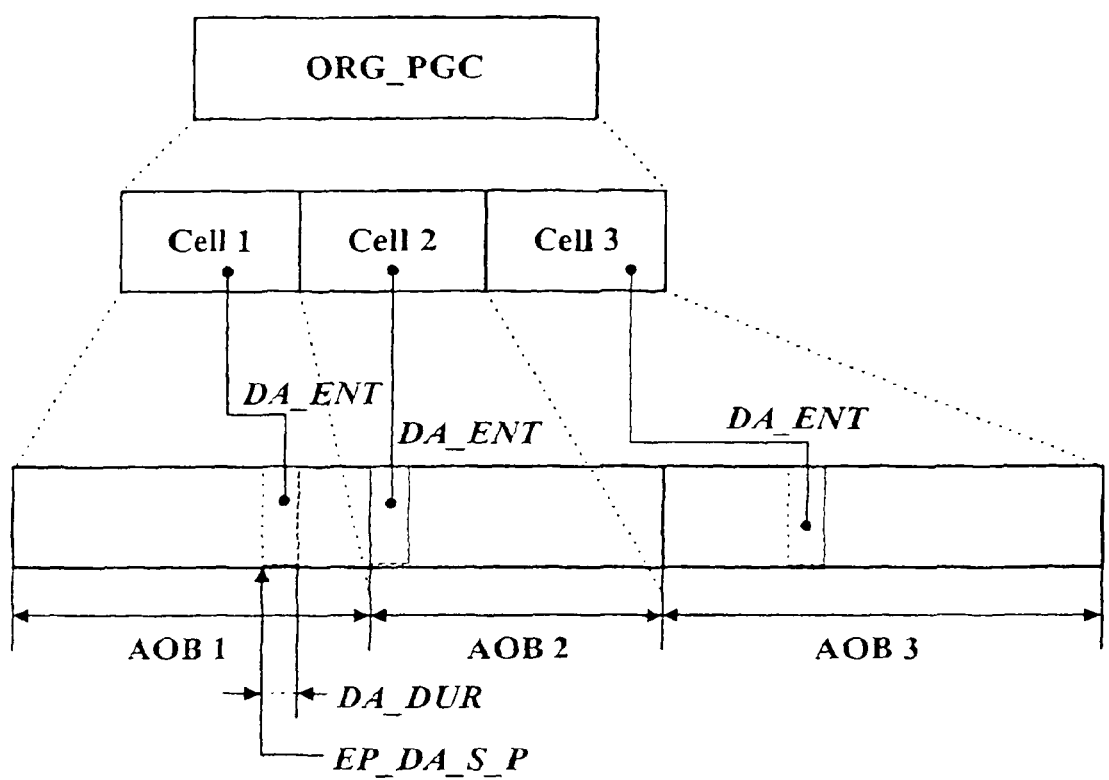
FIG. 5 shows a schematic relation between audio objects including respective sample audio section therein and their management information formed on a basis of the format of FIG. 4.

In order that the invention may be fully understood, preferred embodiments thereof will now be described with reference to the accompanying drawings.

FIG. 1 is a simplified block diagram of an optical disk device in which a data recording/reproducing method of the present invention is embedded. The device may be a disk drive installed in a personal computer (PC) being able to connect to Internet.

The disk device of FIG. 1 comprises an interface 8 sending/receiving data to/from an external machine such as a PC; a recording processor 3 converting source data and management information thereof received through the interface 8 to writing signal suitable for a placed writable disk, e.g., DVD-RAM 1; an optical pickup 2 writing the writing signal to the DVD-RAM 1 and reading the written signal therefrom; a reproducing processor 4 processing the read signal to restore to original data; a buffer 6 buffering temporary data produced during recording or reproducing operation; a memory 7, e.g., a flash memory for storing navigation data, which are management information used for reproduction control of recorded data, and Digital Right Management (DRM) information which authorizes play of source data; and a system controller 5 controlling all the elements in record or playback mode, and selecting source or sample data based on the DRM information, all operatively coupled and configured.

Purchase of the DRM information can be made on-line from a web site on Internet providing associated source data, and it is downloaded into a management information area of the DVD-RAM 1 or into the flash memory 7.

In the meantime, the source data, which may be moving picture or audio data, are downloaded onto the DVD-RAM 1 through Internet or are formed onto a read-only medium such as a DVD-ROM through disk manufacturing process.

If the source data are audio, a single audio track is preferably unitized to an audio object (AOB) that consists of several object units (AOBUs).

In addition, a specific data section is designated to sample data that can be pre-played during record or manufacturing if there is no play authorization.

When audio data are received from a web site on Internet through the interface 8, the system controller 5 records them onto the DVD-RAM 1, and unitizes the recorded audio data to a single logical track. The unitized logical track is managed as a single AOB. A logical track is different from a physical spiral track formed in a writable disk. If recording operation stops after a single audio song provided from outside has been recorded, the recorded song becomes a single logical track (a track means a logical track, hereinafter).

All the audio songs recorded onto the DVD-RAM 1, namely, all tracks are indexed by a track set information called program chain (PGC). Information for a track recorded newly is inserted in the track set information and information for an erased track is deleted from the track set information.

A part of a track (PoT) specified within an audio track by editing process can be reproduced. Such a partial reproduction is initiated through selecting a play list which is used for defining audio track playback order.

After a track has been recorded or edited, cell information (CI) is created to refer to entire or part of a track. The created cell information is written in original or user-defined program chain information (PGCI). A play list is linked with a piece of PGCI through PGCI index number.

As shown in FIG. 2, the PGCI may include plural pieces of CIs. After audio data are recorded on the writable DVD 1 through the recording processor 3, the system controller 5 creates a piece of CI in connection with each track of the recorded data. The created CI consists of Audio Cell General Information 'A_C_GI' and at least one piece of Audio Cell Entry Point Information 'A_C_EPI'. The information 'A_C_GI', as shown in FIG. 2, contains start 'A_C_S_P' and end position information 'A_C_E_P' of the recorded track, namely, AOB.

The cell entry point information can contain different information according to its type defined in a type field 'EP_TY'. The location information on sample audio section according to the present invention is written in this cell entry point information with bit value '0001XXXX' ('X' means 'don't-care) in the type field 'EP_TY'. The cell entry point information with bit value '0001XXXX' in the type field, as shown in FIG. 3, contains start and end position information of sample audio section in the two fields 'EP_DA_S_P' and 'EP_DA_E_P', respectively.

If the field 'EP_TY' of cell entry point information has a value of '0110XXXX', it means that the cell entry point information has only single position information indicating a random accessible point.

The audio cell entry point information may include a duration of sample audio section in a field 'DA_DUR' replacing the end point field 'EP_DA_E_P', as shown in FIGS. 4 and 5.

The system controller 5 plays entire source data downloaded onto or written on the DVD-RAM 1 or only sample data thereof with reference to the management information structured as above. The selection of entire source data or sample data thereof is based on whether there is DRM information for the downloaded or written source data.

This selective reproduction method is explained in detail below.

Figure 6A:
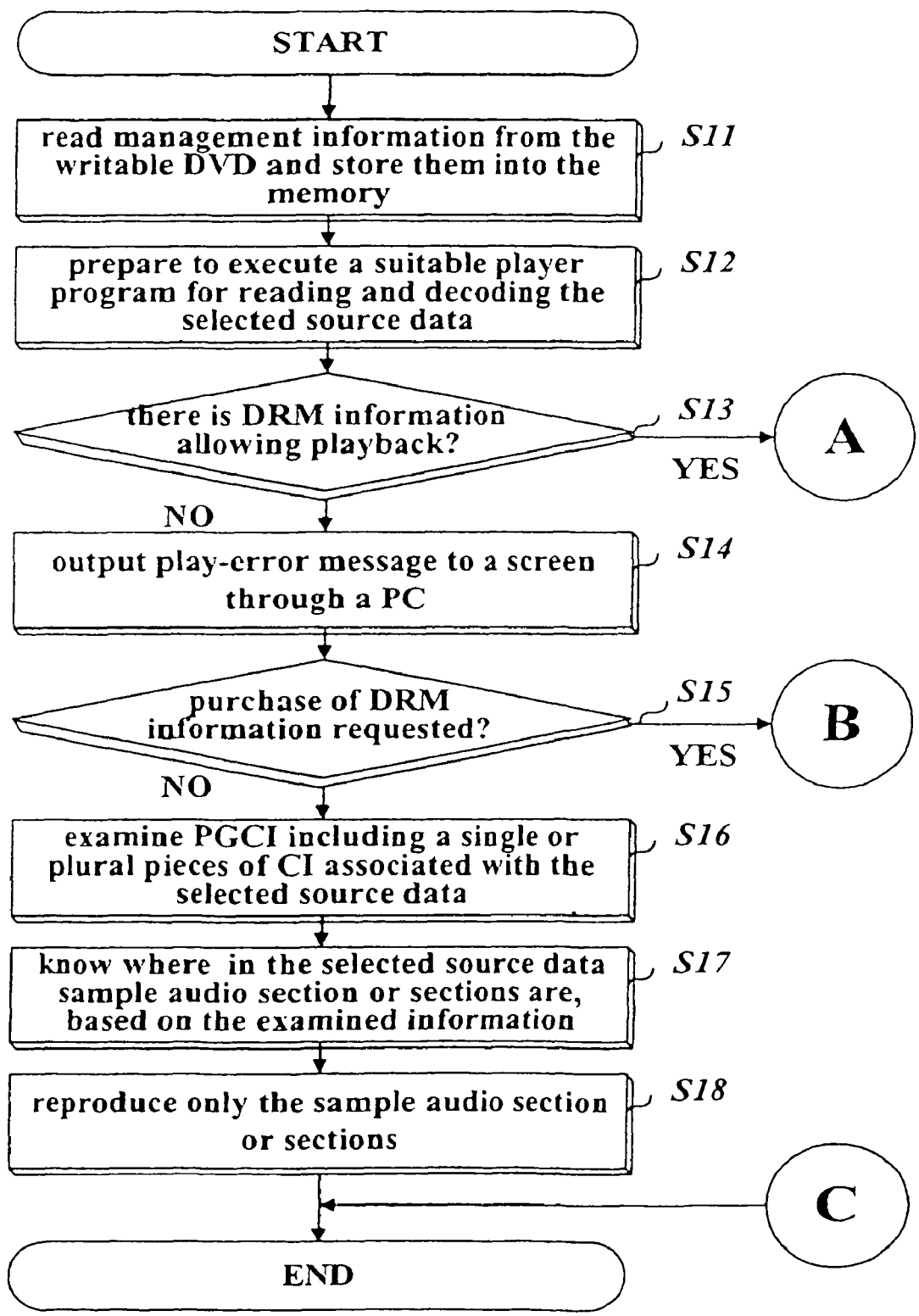

FIGS. 6a and 6b are flow charts of an embodiment of a method playing entire or sample data selectively in accordance with the present invention.

When or before source data are selected to be played back, the system controller 5 reads the above-explained management information, namely, PGCI, CI, and so on from the writable DVD 1 and stores into the flash memory 7 (S11). The source data contains a single track or a plurality of tracks. If necessary, the system controller 5 will execute a suitable player program for reading and decoding the selected source data (S12). Before reading the source data, the system controller 5 checks whether or not there is DRM information allowing playback of the source data in the management area of the DVD-RAM 1 or in the flash memory 7 (S13).

If there is not, the system controller 5 composes a play-error message and sends it to a connected PC (S14). The play-error message includes explanation about DRM information purchase as well as the cause that there is no DRM information related with the selected audio data.

Figure 7:
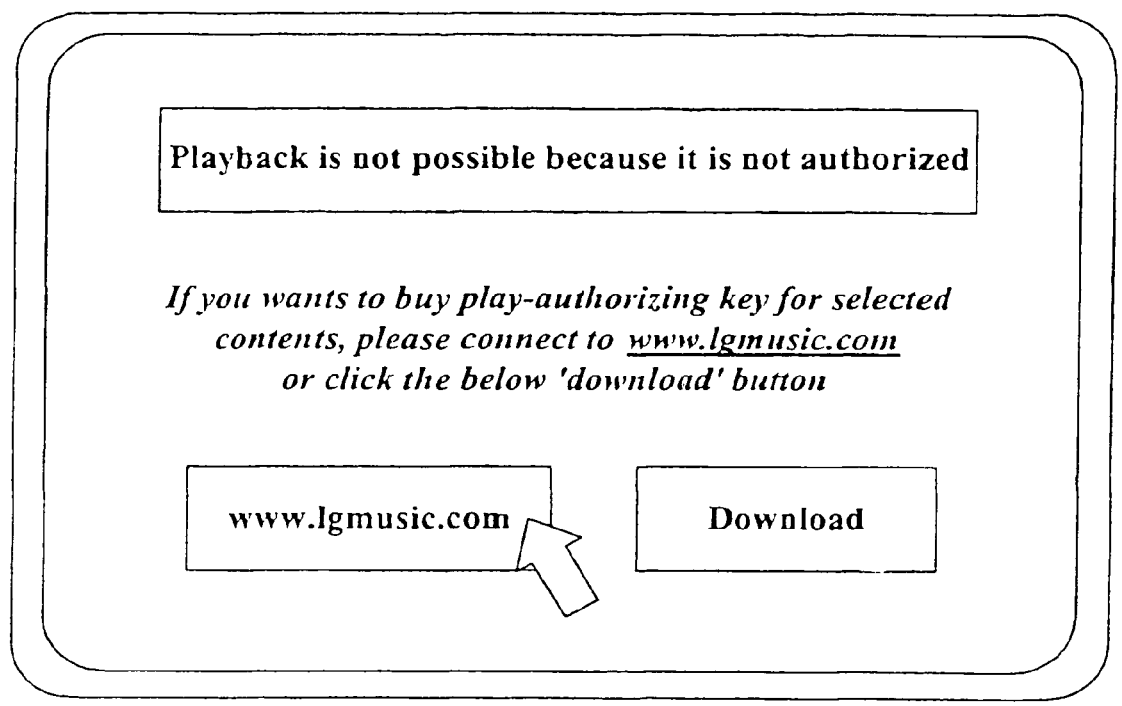
FIG. 7 is a screen example where a play-error window is popped up because of no play-authorizing information.

FIG. 7 is a screen example where such a play-error message is outputted. The play-error message displayed in FIG. 7 includes an inquiry window that asks a user whether to buy DRM information or not. The illustrative inquiry window also includes a URL (Uniform Resource Locator) addressing a web site on Internet that provides DRM information and a download button that enables a user to buy DRM information related with the selected source data through download.

If on-line purchase of DRM information is not made (S15), the system controller 5 examines PGCI, e.g., original PGCI, stored in the flash memory 7, including a single or plural pieces of CI associated with the selected source data (S16). Then, the system controller 5 knows where in the selected source data sample audio section or sections are (S17), based on the pair fields 'EP_DA_S_P' and 'EP_DA_E_P' or 'EP_DA_S_P' and 'DA_Dur' of the cell entry point information in CI.

Afterwards, the system controller 5 searches the DVD-RAM 1 for sample audio section pointed by the fields of the cell entry point information in CI through moving the optical pickup 2 inward and outward, and it reproduces only the sample audio section (S18). If the selected source data includes a plurality of audio tracks, the, system controller 5 reproduces sample audio section included in each track sequentially.

Consequently, a user can determine whether or not to buy play-authorizing information for source data after pre-listening or previewing respective partial audio song or movie recorded on a recording medium without purchasing play-authorizing information.

If there is DRM information in the management area of the DVD-RAM 1 or in the flash memory 7 (S13), the system controller 5 examines PGCI in the flash memory 7, including a single or plural pieces of CI associated with the selected source data (S20). Then, the system controller 5 knows where each audio track of the selected source data is, based on the fields 'A_C_S_P' and 'A_C_E_P' in each CI (S21) Afterwards, the system controller 5 searches for each audio track pointed by the two fields in CI, and reproduces the audio track or tracks (S22) sequentially until last audio track is encountered if several tracks are included in the source data.

If a user requests on-line purchase of DRM information in the situation that the play-error window has been displayed (S15), the system controller 5 reads from the management area of the DVD-RAM 1 or the flash memory 7 a URL (Uniform Resource Locator) information of a web site that provides DRM information for the selected source data and data identification, e.g., 2-byte serial number assigned to the source data downloaded to the DVD-RAM 1 or disk identification if the placed disk is read-only. The read address and data or disk identification are transmitted to the connected PC (S30).

The above purchasing process is initiated by a user's clicking the 'download' button on the illustrative play-error window shown in FIG. 7.

The web site addressed by the stored URL identifies which DRM information is requested based on the received disk or data identification. Namely, it searches its database for DRM information linked with the received identification or serial number. If found, the web site downloads the found DRM information to the PC. The PC delivers the downloaded DRM information to the system controller 5 of the disk drive connected to the PC (S31). This DRM information delivery may be conducted in accordance with a protocol pre-specified between the web site and a PC connected to the web site.

The system controller 5 separates the received DRM information into play-authorizing information for each AOB or track, and stores them in the flash memory 7 or in the management information area of the DVD-RAM 1 in connection with respective track (S32). Afterwards, the system controller 5 reproduces entire selected source data written in the DVD-RAM 1 using the DRM information stored in the memory 7 or on the DVD-RAM 1 the same as explained above.

If a placed recording medium is read-only, the DRM information downloaded through the explained manner is stored in a memory of a disk drive.

In addition, if the above-explained method that reproduces entire source data or sample data thereof depending on existence of play-authorizing information is not embedded in a disk device, a program executing the method can be downloaded to the disk device from a web site providing the play-authorizing information and source data. Moreover, the program executing the method can be pre-recorded on a read-only recording medium.

The above-explained method is applicable to a variety of disks such as a compact disk (CD) and video CD besides read-only DVD and writable DVD. Further, the present method can be applied to moving-picture data and still-picture data, besides audio data.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of reproducing digital content in a data reproducing device, the method being performed by at least one device, the method comprising:

(a) receiving a unitary item of digital content from a first external source, the unitary item of digital content including an encrypted content section and a sample section, wherein Digital Right Management (DRM) information is used for authorizing a reproduction of the encrypted content section, wherein the unitary item of digital content is associated with management information including additional information about the unitary item of digital content, and wherein the additional information includes a Uniform Resource Locator (URL) information, an identification information assigned to the unitary item of digital content, and indication information for providing a preview of the unitary item of digital content;

(b) in response to a request to reproduce the encrypted content section, automatically reproducing the sample section after it is determined that the DRM information does not exist in the reproducing device, wherein the sample section is reproduced using the indication information indicating a portion of the sample section in the unitary item of digital content, and wherein the sample section is non-encrypted, the sample section is a subset of the unitary item of digital content, and the sample section is used for providing a preview;

(c) after reproducing the sample section, receiving the DRM information from a second external source using the URL information and the identification information, wherein the second external source is indicated by the URL information, wherein the DRM information is associated with the identification information of the received unitary item of digital content; and (d) reproducing the encrypted content section using the received DRM information.

2. The method of claim 1, wherein the unitary item of digital content comprises a plurality of digital audios or videos.

3. The method of claim 1, wherein the first external source is different from the second external source.

4. The method of claim 1, wherein the step of receiving the DRM information comprises:

(b1) reading the identification information and the URL information from the additional information; and (b2) transmitting the identification information to the second external source by using the URL information.

5. An apparatus for reproducing digital content and programmed to perform the following steps:

receiving a unitary item of digital content from a first external source, the unitary item of digital content including an encrypted content section and a sample section, wherein Digital Right Management (DRM) information is used for authorizing a reproduction of the encrypted content section, wherein the unitary item of digital content is associated with management information including additional information about the unitary item of digital content, wherein the additional information includes a Uniform Resource Locator (URL) information, an identification information assigned to the unitary item of digital content, and indication information for providing a preview of the unitary item of digital content, in response to a request to reproduce the encrypted content section, automatically reproducing the sample section after it is determined that the DRM information does not exist in the reproducing device, wherein the sample section is reproduced using the indication information indicating a portion of the sample section in the unitary item of digital content, and wherein the sample section is non-encrypted, the sample section is a subset of the unitary item of digital content, and the sample section is used for providing a preview, after reproducing the sample section, receiving the DRM information from a second external source using the URL information and the identification information, wherein the second external source is indicated by the URL information, wherein the DRM information is associated with the identification information of the received unitary item of digital content, and reproducing the encrypted content section using the received DRM information.

6. The apparatus of claim 5, further programmed to perform a step of:

transmitting the identification information to the second external source using the URL information.

7. The apparatus of claim 5, further programmed to perform a step of:

storing the requested DRM information to be received from the second external source.

8. The apparatus of claim 7, wherein the requested DRM information is stored bound to an identification information.

9. The apparatus of claim 7, wherein the requested DRM information is stored after payment for the DRM information.

10. The apparatus of claim 5, wherein the unitary item of digital content comprises a plurality of digital audios or videos.

11. The apparatus of claim 5, wherein the first external source is different from the second external source.

12. The method of claim 1, wherein a portion of the unitary item of digital content other than the sample section is encrypted.

13. The apparatus of claim 5, wherein a portion of the unitary item of digital content other than the sample section is encrypted.

* * * * *